United States Patent [19]

Chen et al.

[11] Patent Number: 4,604,261
[45] Date of Patent: Aug. 5, 1986

[54] HYDROPROCESSING REACTOR FOR CATALYTICALLY DEWAXING LIQUID PETROLEUM FEEDSTOCKS

[75] Inventors: Nai Y. Chen, Titusville, N.J.; Thomas F. Degnan, Yardley, Pa.

[73] Assignee: Mobil Oil Corporation, New York, N.Y.

[21] Appl. No.: 626,519

[22] Filed: Jun. 29, 1984

[51] Int. Cl.⁴ ................................................. B01J 8/04
[52] U.S. Cl. .................................... 422/191; 422/194; 422/195; 422/171; 208/27; 208/29; 208/30; 208/32
[58] Field of Search ............... 422/177, 191, 181, 188, 422/189, 190, 192, 197, 195, 194, 171; 208/28, 29, 30, 32, 38, 27

[56] References Cited

U.S. PATENT DOCUMENTS

| | | | |
|---|---|---|---|
| 3,443,910 | 5/1969 | Newman et al. | 422/171 |
| 3,632,659 | 1/1972 | Jones | 422/190 |
| 3,751,232 | 8/1973 | Borre et al. | 422/191 |
| 3,879,944 | 4/1975 | Bertsch | 422/171 |
| 3,979,185 | 9/1976 | Stevenson | 422/171 |
| 4,089,654 | 5/1978 | Polinski et al. | 422/190 |
| 4,126,430 | 11/1978 | Roberge | 422/191 |
| 4,200,616 | 4/1980 | Johansen | 422/177 |
| 4,335,076 | 6/1982 | McFarland | 422/171 |
| 4,405,562 | 9/1983 | Zardi et al. | 422/194 |
| 4,481,106 | 11/1984 | Verachtert | 422/239 |

Primary Examiner—David L. Lacey
Assistant Examiner—Titus B. Ledbetter, Jr.
Attorney, Agent, or Firm—Alexander J. McKillop; Michael G. Gilman

[57] ABSTRACT

A hydroprocessing trickle reactor construction which will facilitate the catalytic dewaxing of liquid petroleum or lube feedstocks in a highly efficient and economical manner, particularly through the use of reactors employing stationary bed of a defined, shape-selective crystalline aluminosilicate zeolite catalyst, preferably ZSM-5. Pursuant to one embodiment of the hydroprocessing reactor, the latter is essentially constituted of a trickle bed reactor wherein a plurality of vertically tiered and staggered trays support the beds of catalyst material, such as the crystalline zeolite, and through which the liquid petroleum feedstock trickles downwardly from the upper end of the reactor, while hydrogen is concurrently injected into the catalyst on each of the trays. This causes the hydrogen to percolate through the catalyst bed and to contact and efficiently strip the downwardly trickling stream of liquid petroleum feedstock of low boiling conversion products or waxy components, such as naphtha. Pursuant to a second embodiment of the hydroprocessing catalystic reactor construction, inclined supporting stationary beds of catalyst are vertically tiered with the liquid petroleum stock trickling down through the reactor so as to enter the upper portion of the bed contained in each tray, flowing along the inclined tray surface thereof forming a liquid seal along the bottom surface of each tray and forcing hydrogen introduced into each tray to flow upwardly through the catalyst bed and react with the liquid petroleum feedstock. The liquid is directed to trickle downwardly to a lower catalyst bed through the interposition of suitable baffles, whereas hydrogen gas inclusive of low boiling, volatile conversion products stripped from the liquid petroleum in the catalyst beds flows upwardly through passages beneath the baffles into a central vertical conduit in the reactor, from when they are conducted by being entrained in an upwardly-flowing carrier gas out of the upper end of the reactor.

12 Claims, 2 Drawing Figures

HYDROPROCESSING REACTOR FOR CATALYTICALLY DEWAXING LIQUID PETROLEUM FEEDSTOCKS

BACKGROUND OF THE INVENTION

1. Field of the Invention

The present invention relates to a reactor for catalytically dewaxing a waxy distillate consisting of a lubricating oil or liquid petroleum feedstocks utilizing a shape-selective crystalline aluminosilicate zeolite catalyst in rder to obtain a lubricating oil having a low pour point and a high viscosity index, and more particularly, relates to a novel and unique hydroprocessing multi-bed trickle reactor construction for catalytically dewaxing liquid petroleum feedstocks.

In the hydroprocessing of liquid petroleum feedstocks, and particularly so called heavy feedstocks, it is a basic purpose of the process of catalytically dewaxing the liquid petroleum feedstocks of removing lighter conversion products from the liquid petroleum flow while concurrently providing a hydrogenative environment for catalytic conversion, which is particularly utilized in the case of the processing of highly waxy feedstocks, such as in catalytic lube processing. Frequently, lighter products which are obtained from cracking and/or hydrocracking reactions compete with the heavier feed molecules for access to the acidic cracking sites in zeolites or silica-alumina cracking catalysts which are employed in the implementation of the catalytic dewaxing processes. Inasmuch as these lighter products diffuse more rapidly into the catalyst than the larger feed molecules, they have a tendency to retard the rate of conversion of the heavier molecules. Moreover, the lighter products also tend to be either more difficult to crack, such as low molecular weight parafins, or easier to polymerize, such as low molecular weight olefins, and possess a tendency to coke more readily then their heavier counterparts so as to thereby retard the conversion of the heavier molecules to an even greater extent.

2. Discussion of the Prior Art

This competition between the light and heavy liquid petroleum molecules obtained from the cracking or hydrocracking process for access to catalytic sites is rendered particularly critical when there is employed a catalyst which is essentially constituted of a shape-selective zeolite, for example, a defined crystalline aluminosilicate zeolite catalyst, such as ZSM-5, for the dewaxing of liquid petroleum or lube stocks under moderate hydrogen pressures (400 psig) and at moderate temperatures (550° F. to 675° F). In a typical reactor employing a zeolite catalyst, for example, such as zeolite ZSM-5, compounds which boil at temperatures higher then 650° F. flow concurrently with naphtha and LPG over the shape-selective catalyst. Processes and reactors which utilize aluminosilicate zeolite catalysts, such as ZSM-5, or other zeolites having smaller pore openings, such as ZSM-11, ZSM-12 and larger then those of erionite or zeolite ZK-5; ZSM-23 and ZSM-35, are disclosed in Bruce P. Pelrine et al. U.S. Pat. No. 4,222,855 and in Nai Y. Chen et al. U.S. Pat. No. Re. 28,398, both assigned to the Mobil Oil Corporation, and the disclosures of which are incorporated herein by reference. Although the utilization of different types of hydroprocessing reactors for the implementation of catalytic dewaxing processes for liquid petroleum lube or feedstock is broadly disclosed in the prior art, as exemplified by the above-mentioned U.S. patents, broadly referring to stirring tank-type reactors or trickle bed reactors, there is an obvious need in the technology to more precisely define specific hydroprocessing reactor designs which, in a highly efficient and novel manner, will facilitate the removal of the lighter products from the liquid petroleum feedstocks through the intermediary of hydrogen stripping while concurrently preserving an intimate three-phase contacting relationship among hydrogen, liquid petroleum feedstock and catalyst, which is necessary for the efficient hydrotreatment and upgrading through the dewaxing of the liquid petroleum feedstocks.

SUMMARY OF THE INVENTION

In essence, the present invention provides for a novel hydroprocessing reactor construction which will facilitate the catalytic dewaxing of liquid petroleum or lube feedstocks in a highly efficient and economical manner, particularly through the use of reactors employing stationary beds of a defined, shape-selective crystalline aluminosilicate zeolite catalyst, preferably ZSM-5. Pursuant to particular features of the inventive hydroprocessing reactor, the latter is essentially constituted of a trickle bed reactor wherein a plurality of vertically tiered and staggered trays support the beds of catalyst material, such as the crystalline zeolite, and through which the liquid petroleum feedstock trickles downwardly from the upper end of the reactor, while hydrogen is concurrently injected into the catalyst on each of the trays. This causes the hydrogen to percolate through the catalyst bed and to contact and efficiently strip the downwardly trickling stream of liquid petroleum feedstock of low boiling conversion products or waxy components, such as naphtha. The generated gases resulting from the reaction, such as hydrogen, naphtha and LPG are collected in head spaces provided above the catalyst beds on each of the catalyst-containing trays, and are discharged through entrainment in an inert carrier gas introduced into the reactor and which flows about each of the trays.

Pursuant to a specific embodiment of the inventive hydroprocessing catalytic reactor construction, inclined supporting stationary beds of catalyst, such as shape-selective crystalline zeolite, in essence, ZSM-5, are vertically tiered with the liquid petroleum stock trickling down through the reactor so as to enter the upper portion of the bed contained in each tray, flowing along the inclined tray surface thereof forming a liquid seal along the bottom surface of each tray and forcing hydrogen introduced into each tray to flow upwardly through the catalyst bed and react with the liquid petroleum feedstock. The liquid is directed to trickle downwardly to a lower catalyst bed through the interposition of suitable baffles, whereas hydrogen gas inclusive of low boiling, volatile conversion products stripped from the liquid petroleum in the catalyst beds flows upwardly through passages beneath the baffles into a central vertical conduit in the reactor, from whence they are conducted by being entrained in an upwardly-flowing carrier gas out of the upper end of the reactor without further contacting the hydroprocessed and dewaxed liquid petroleum feedstock.

Accordingly, it is a primary object of the present invention to provide a novel hydroprocessing reactor of the trickle type for catalytically dewaxing liquid petroleum feedstocks.

It is a more specific object of the present invention to provide a hydroprocessing trickle reactor wherein lighter volatile or low boiling conversion products are stripped from liquid petroleum feedstock trickling downwardly through stationary catalyst beds by means of hydrogen in counterflow therewith, percolating through the catalyst bed while stripping the low boiling volatile conversion products, and the gases of the hydrogen and volatile conversion products being entrained in and being scavenged by a carrier gas flowing about the catalyst beds.

In essence, the present invention has as its object the provision of a hydroprocessing catalyric reactor of the trickle type as described in which a plurality of vertically tiered trays each supporting a fixed catalyst bed, in which the catalyst comprises a defined, shape-selective catalyst material, crystalline aluminosilicate zeolite catalyst, is traversed by a downwardly trickling flow of a liquid petroleum feedstock or lube, with the catalyst bed having hydrogen injected therethrough in counterflow with the liquid petroleum so as to react therewith in the presence of the catalyst, and to efficiently strip the liquid petroleum of low boiling and volatile conversion products, such as naphtha and LPG gases and with the generated gases entraining the conversion products from the feedstock being removed by an inert carrier gas flowing through the reactor about the trays supporting the catalyst beds.

Yet another object of the present invention is to provide a hydroprocessing trickling reactor for catalytically dewaxing liquid petroleum feedstocks in which a plurality of inclined trays supporting crystalline catalyst material beds are vertically arranged in tiers with the liquid petroleum feedstocks trickling down through each catalyst bed and flowing out at the lower side of each inclined tray so as to form a liquid seal at the bottom of each catalyst bed forcing hydrogen injected into each catalyst bed to flow up through the bed in countercurrent flow with the downwardly trickling liquid flow, and to entrain therein low boiling conversion products from the liquid petroleum feedstock, with the hydrogen and the stripped volatile products therein passing beneath the baffles into a central conduit for removal from the reactor by a carrier gas without reentering the catalyst beds.

BRIEF DESCRIPTION OF THE DRAWINGS

Reference may now be had to the following detailed description of preferred embodiments of the invention which are representative of hydroprocessing trickle reactors for catalytically dewaxing liquid petroleum feedstocks, taken in conjunction with the accompanying drawings; in which.

DETAILED DESCRIPTION

Figure 1:
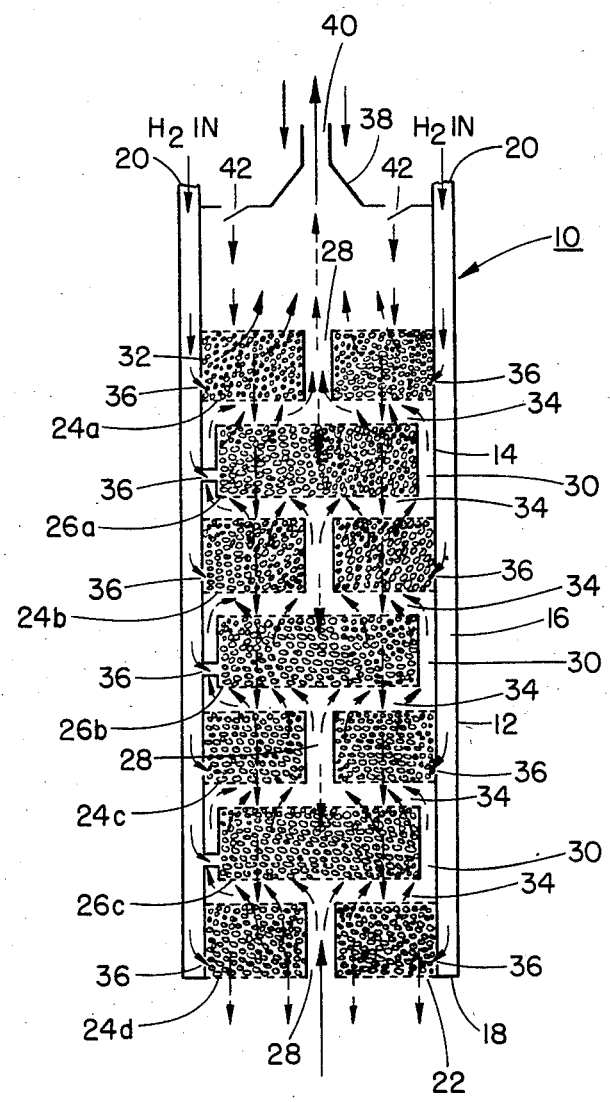
FIG. 1 diagrammatically illustrates a vertical sectional view through a first embodiment of a hydroprocessing trickle reactor constructed pursuant to the invention.

Referring now in detail to the embodiment of the hydroprocessing trickle reactor 10 as disclosed in FIG. 1 of the drawings, the reactor consists of an essentially upright container or tower structure having an outer wall or shell 12 which, if desired, may be of substantially cylindrical construction. Arranged within the outer wall or shell 12 is an inner similarly-shaped wall 14; which in effect, may also be of a substantially cylindrical construction, and of a smaller diameter or cross-section so as to provide an annular interspace or turns 16 between the outer and inner cylindrical walls 12, 14 extending over the height of the reactor. The lower end of the annular space 16 between the walls 12, 14 is closed off by a bottom closure 18, whereas the upper end of the annular space 16 is provided with inlet ports 20, in this instance, for hydrogen.

Mounted in the area in the upright container 10 of the hydroprocessing trickle reactor structure within the wall 14, which has an essentially open-ended central bottom 22 are a plurality of catalyst-supporting trays which are vertically tiered, in a staggered relationship in the alternating tiers so as to form a number of vertically spaced catalyst beds. In essence, each of the catalyst trays consists of, in vertically alternating tiered relationship, an annular or toroidally-shaped tray 24a, 24b, 24c and 24d, each supporting a catalyst material, which consists of a lower support plate for the catalyst having apertures therein to permit the throughflow or downward trickling therethrough of a liquid.

Interposed between each of the tiers of trays 24a through 24d are tiers of trays 26a, 26b and 26c, each supporting a catalyst material, which are of generally disc-shaped configurations. The trays 24a through 24d are fastened through suitable means, such as rods or braces, to the inner surface of the inner cylindrical wall 14, and are of an essentially toroidal configuration to provide for a central passageway 28 therethrough, whereas the trays 26a through 26c are arranged so as to provide for annular passageways or spaces between the outer edges thereof and the inner wall 14, such annular passageways being identified by the reference numeral 30.

The trays 24a through 24d, and 26a through 26c each support a layer or bed of a crystalline catalyst material 32, the catalyst material being of a height to allow for the formation of passageways 34 above the catalyst beds between each of the vertically-oriented tiers of trays so as to form a continuously connected flow passageway extending throughout the vertical height of the tower 10 defined by the interconnecting passageways 28, 34 and 30, with the uppermost passageway 28 communicating with the upper end of the reactor 10 and the lowermost passageway 28 communicating with the bottom outlet 22 of the reactor. The lower portions of each of the reactor beds 32 which are supported on the respective trays 24a through 24d and 26a through 26c, are each in communication with the annular space 16 in the circumference of the reactor 10 through a plurality of suitable inlet orifices 36 formed in and spaced about the inner wall structure 14.

An inlet conduit 38 which may be essentially of a hood configuration having a central opening 40 and providing annularly spaced openings 42 may be arranged at the upper end of the reactor 10.

The operation of the hydroprocessing trickle reactor 10 for catalytically dewaxing liquid petroleum stocks is essentially as follows:

A flow of a liquid petroleum feedstock which is to be dewaxed in the inventive trickle hydroprocessing reactor 10 is introduced at the upper end of the reactor 10 through the openings 42 to provide for a downflow in a trickling mode through the successive catalyst bed-supporting trays 24a, 26a, 24b, 26b, 24c, 26c, and 24d, the successive tiers of which are laterally staggered so as to prevent the liquid from passing by any catalyst beds during the downward trickling of the liquid petroleum feedstock through the reactor. Concurrent with the infeed of the liquid petroleum feedstock through the openings 42, hydrogen in a gaseous form is introduced at a slight superpressure through inlets 20 downwardly into the annular space 16 between the reactor shell walls 12 and 14 so as to be forced through the inlet openings 36 into the lower portions of the various vertically tiered catalyst beds.

Each of the trays 24, 26 supports a layer or bed of the catalytic material, which in a preferred instance is constituted of shape-selective crystalline aluminosilicate zeolite catalyst, preferably supported metal ZSM-5, although as mentioned hereinbefore, other zeolites such as described in Pelrine et al. U.S. Pat. No. 4,222,855 and Chen et al. U.S. Pat. No. Re. 28,398 may be also employed with similar advantage.

The intimate contacting of the hydrogen in the presence of the zeolite catalyst material with the downward trickling flow of the liquid petroleum feedstock will produce a catalytic reaction, preferably under moderate hydrogen pressures of about 400 psig and moderate temperatures of 550° to 675° F., to cause compounds boiling at temperatures higher than 650° to flow concurrently with naphtha and LPG in the liquid petroleum feedstock over the shape-selective zeolite catalyst.

The lighter, more readily boiling or volatile products from the heavy feedstock liquid are caused to be stripped from the heavier fraction by the reaction while, at the same time, preserving the intimate three-phase contacting relationship among the hydrogen, the liquid feedstock and the crystalline zeolite catalyst, so as to be conducted in a gaseous form into the passageway 34 by the hydrogen from each of the catalyst beds which are supported on the various trays 24 and 26, while the heavier liquid fraction being dewaxed by the reaction continues to trickle downwardly through various tiered catalyst beds for continuing dewaxing.

Simultaneously, an inert carrier gas, for instance such as hydrogen, nitrogen or helium, is introduced at the lower end 22 of the hydroprocessing trickle reactor 10 through the central inlet passageway 28, and caused to flow upwardly through the interconnecting passages 28, 34 and 32 towards the upper end of the reactor 10, thereby entraining and carrying along the hydrogen gas released from each of the catalyst beds together with the volatile liquid petroleum feedstock fractions obtained from the reaction and contained in the hydrogen gas. The carrier gas, together with the hydrogen gas and volatile fractions released from the catalyst beds is then discharged at the upper end of the reactor 10 through the outlet 40, whereas the now dewaxed and hydroprocessed liquid petroleum fraction after passing through the catalyst beds is allowed to flow out from the lower end 22 of the reactor 10 for further processing, as required.

A typical product distribution from such a dewaxing reaction is set forth in Table I hereinbelow:

TABLE 1

| Product Distribution | |
| --- | --- |
| Methane | 0.04 wt % |
| Ethane/Ethene | 0.09 |
| Propene | 0.03 |
| Propane | 2.13 |
| Total Dry Gas | 2.29 |
| Isobutane | 1.37 |
| Butenes | 0.03 |

TABLE 1-continued

| Product Distribution | |
| --- | --- |
| n-Butane | 1.44 |
| Total $C_4$'s | 2.84 |
| Total $C_5$'s | 1.98 |
| Naphtha, $C_6^+$ | 3.20 |
| Lube Fraction (dewaxed) | 89.69 |

The upwardly flowing carrier gas and the hydrogen entraining the lighter or volatile components of the liquid petroleum feedstock obtained from the reaction in the catalyst beds, and which are conducted through passageways 28, 34 and 30 towards the upper outlet 40 of the reactor 10, are prevented from entering into the catalyst-supporting trays due to the liquid seal which is formed along the tray supporting surfaces for each of the catalyst beds by the liquid petroleum feedstock trickling downwardly through the reactor 10.

Figure 2:
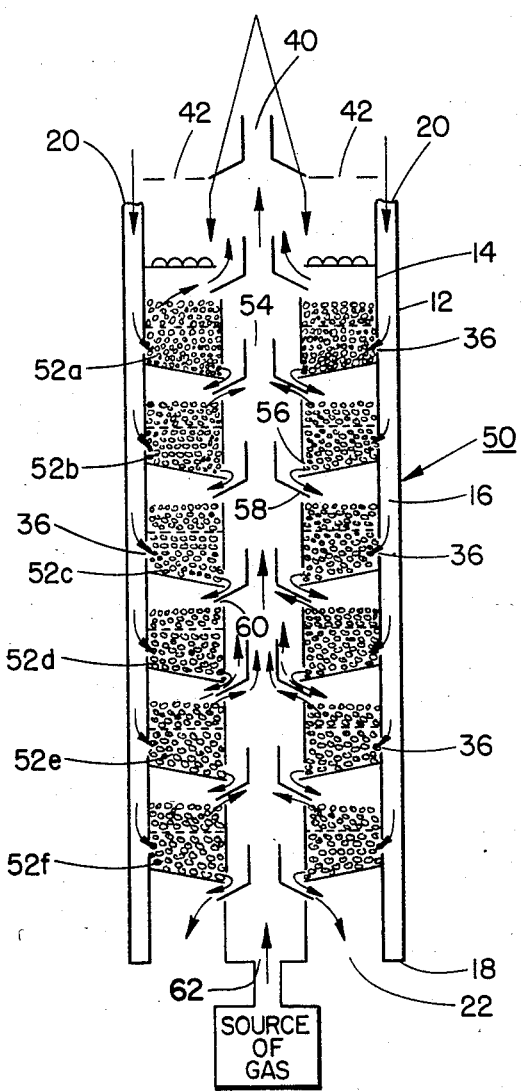
FIG. 2 is a view similar to that of FIG. 1 illustrating a second embodiment of the inventive hydroprocessing reactor.

The embodiment of the hydroprocessing trickle reactor 50 illustrated in FIG. 2 of the drawings represents a modification of the reactor 10 shown in FIG. 1, although it essentially operates in basically the same manner in the catalytic dewaxing of liquid petroleum feedstocks.

In this embodiment of the reactor, the components which are similar to or identical with those illustrated in the embodiment of FIG. 1 are identified by the same reference numerals.

In this embodiment, each of the annular or toroidal trays supporting the catalyst beds; in essence, trays 52a, 52b, 52c, 52d and 52e and 52f are tiered in spaced relationship above each other, and are shaped so as to form a vertical central passageway 54 extending along substantially the full height of the reactor 50. The catalyst-supporting surfaces of each of the catalyst trays 52 are sloped downwardly toward the vertical central axis of the reactor 50 and incorporate discharge openings 56 for the discharge of liquid petroleum feedstock trickling downwardly in succession through the vertically tiered catalyst beds.

Suitable deflectors 58 are positioned below each of the discharge openings 56 so as to direct the flow of the liquid petroleum feedstock into a catalyst bed 52 positioned therebelow. Concurrently, hydrogen gas introduced through apertures 36 into the catalyst beds from annular space 16, after reacting with the feedstock, is conducted together with the volatile lighter fractions of the liquid petroleum which the hydrogen causes to released in a gaseous form from each of the catalyst beds, into the central passageway 54 through discharge orifices 60 arranged above each of the catalyst beds and below the sloping portion of each hood 58 which guides the gases into the central passageway 54. The hydrogen gases and entrained voletile fractions of the feedstock discharged from each of the catalyst beds are inhibited from re-entering a catalyst bed arranged thereabove through the formation of a liquid seal at each orifice 56 by the trickling liquid petroleum which flows therethrough.

In order to assist in the removal of the hydrogen gases which have been released from the catalyst beds together with the entrained volatile lighter liquid petroleum feedstock fractions, a suitable inert carrier gas, for example, such as hydrogen, nitrogen or helium, is introduced into the reactor 50 at the lower end of the vertical passageway 54 through an inlet port 62, and conducts the hydrogen gas and volatilized liquid petroleum fractions out of the reactor through the discharge opening 40 at the upper end thereof, in a manner similar to that as described in connection with the embodiment of FIG. 1.

The dewaxed liquid petroleum fraction is then discharged from the lower end of the reactor 50 through the open bottom 22.

It also will be obvious to one skilled in the art that the number of superimposed or tiered catalyst beds supported on trays may vary in quantity and configuration as may be required by the particular lube or petroleum feedstock hydroprocessing conditions.

From the foregoing it becomes readily apparent to one skilled in the art that the present invention provides for a novel and improved hydroprocessing reactor for catalytically and efficiently dewaxing liquid petroleum feedstocks with a significant increase in the reaction rate and concomitant reductions in the catalyst coking rate, thereby resulting in appreciable capital cost savings through reduced reactor size and catalyst fill requirements, and also providing for reduced operating costs through reductions in down time for catalyst reactivation and rejuvenation. Furthermore, an additional economic advantage which is obtained through the inventive reactor design lies in that more of the cracked or hydrocracked product from the liquid petroleum feedstocks are recovered as utilizeable naphtha boiling range components rather than as light gas.

While there has been shown and described what are considered to be preferred embodiments of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A hydroprocessing reactor for catalytically dewaxing liquid petroleum feedstocks comprising:
   (a) a substantially vertical, open-bottomed container having an inner and an outer wall defining an annular space therebetween, means for sealing the lower end of said annular space, and a central portion within said inner and outer walls;
   (b) a plurality of vertically tiered trays mounted within the central portion of said container, and defining flow passageways intermediate said trays; a bed of crystalline aluminosilicate catalyst being supported on each of said trays;
   (c) inlet means at the upper end of said container for the infeed of liquid petroleum feedstock into said central portion of said container to cause said liquid feedstock to trickle downwardly through said catalyst beds and trays towards the open bottom end of said container;
   (d) inlet means at the upper end of said annular spaced for the infeed of hydrogen; apertures in said inner wall communicating said annular space with the lower portion of each of said catalyst beds to cause hydrogen to percolate upwardly through the catalyst bed on each tray and react with the liquid petroleum feedstock trickling downwardly therethrough and to strip low-boiling volatile conversion products from the liquid petroleum feedstock, said hydrogen gas and entrained conversion products flowing into the flow passageways intermediate said catalyst beds and trays; and
   (e) an inlet to the flow passageways, said inlet being located at the bottom end of said container for introducing an upwardly directed flow of inert carrier gas into said flow passageways, further including flow passage means providing flow communication with said inlet and said passageways whereby said carrier gas and the hydrogen gas with the entrained conversion products are conducted upwardly through said flow passageways and scavenged from the upper end of said container.

2. A reactor as claimed in claim 1, wherein said inlet for introducing said inert carrier gas is connected to a source of gas selected from the group consisting of hydrogen, nitrogen and helium.

3. A reactor as claimed in claim 1, wherein said container is a generally cylindrical vessel.

4. A reactor as claimed in claim 1, wherein said vertically tiered trays are liquid-pervious.

5. A reactor as claimed in claim 4, wherein each of said catalyst beds and trays have a horizontal lateral dimension and wherein successive tiers of said vertically tiered catalyst beds and trays have widths that are offset with respect to each other along the lateral dimensions of the beds to ensure said liquid petroleum feedstock trickling down through every catalyst bed in said reactor.

6. A reactor as claimed in claim 4, wherein at least sone of said catalyst beds and trays are disc-shaped, and the catalyst beds and trays being dimensioned to form annular passageways between said trays and the inner wall surface of the inner container wall; and further catalyst beds and trays alternating in vertical tiers between said first-mentioned catalyst beds and trays, said further catalyst beds and trays being toroidally-shaped including central passageways, the container being in fluid communication with the central passageway located at the bottom end of the container, said further catalyst beds and trays extending across the entire cross section of the container, and said passageway means comprising said annular passageways and said central passageways.

7. A reactor as claimed in claim 1, wherein each of said catalyst beds and trays are toroidally-shaped and extend across the entire cross section of central passageways along the vertical height of said container, one of said central passageways being located near the bottom end of said container, said inlet being in fluid communication with the central passageways located near the bottom end of the container and the passageway means comprising the central passageway, whereby said hydrogen gases with the volatile conversion products entrained therein are directed into said central passageways from the catalyst beds; baffle means in said central passageways for preventing reentry of said hydrogen gases into the catalyts beds while concurrently directing the flow of the liquid petroleum feeds from the upper catalyst beds into the lower catalyst beds.

8. A reactor as claimed in claim 7, wherein said trays are sloped downwardly towards the central passageways so as to form a liquid seal in conjunction with said baffle means inhibiting reentry of said hydrogen gas into said catalyst beds subsequent to exiting therefrom.

9. A reactor as claimed in claim 7, wherein said inlet is in fluid flow communication with the lower end of said central passageway near the botton end of the container.

10. A reactor as claimed in claim 1, wherein said catalyst comprises a shape-selective crystalline catalyst material.

11. A reactor as claimed in claim 10, wherein said catalyst material comprises a zeolite.

12. A reactor as claimed in claim 11, wherein said zeolite is ZSM-5.

* * * * *